United States Patent
Gao et al.

(10) Patent No.: US 12,554,936 B2
(45) Date of Patent: Feb. 17, 2026

(54) METHOD OF TRAINING DEEP LEARNING MODEL AND METHOD OF PROCESSING TEXT DATA

(71) Applicant: Beijing Baidu Netcom Science Technology Co., Ltd., Beijing (CN)

(72) Inventors: Pengzhi Gao, Beijing (CN); Zhongjun He, Beijing (CN); Zhi Li, Beijing (CN); Hua Wu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 639 days.

(21) Appl. No.: 18/059,389

(22) Filed: Nov. 28, 2022

(65) Prior Publication Data

US 2023/0088360 A1     Mar. 23, 2023

(30) Foreign Application Priority Data

Feb. 28, 2022    (CN) .......................... 202210189268.9

(51) Int. Cl.
     *G06F 17/27*      (2006.01)
     *G06F 40/166*     (2020.01)
     *G06F 40/40*      (2020.01)
     *G06N 20/00*     (2019.01)

(52) U.S. Cl.
     CPC ............ *G06F 40/40* (2020.01); *G06F 40/166* (2020.01); *G06N 20/00* (2019.01)

(58) Field of Classification Search
     CPC ...... G06F 40/40; G06F 18/214; G06F 40/166; G06F 40/44; G06F 40/58
     USPC .......................................................... 704/9
     See application file for complete search history.

(56) References Cited

U.S. PATENT DOCUMENTS

2021/0065058 A1    3/2021    Li et al.

FOREIGN PATENT DOCUMENTS

| CN | 110134772 | 8/2019 |
|----|-----------|--------|
| CN | 111126068 | 5/2020 |
| CN | 112926322 | 6/2021 |

(Continued)

OTHER PUBLICATIONS

First Chinese Office Action, issued in the corresponding Chinese application patent 202210189268.9, dated Oct. 10, 2022, 10 pages.

(Continued)

*Primary Examiner* — Md S Elahee
(74) *Attorney, Agent, or Firm* — HSML P.C.

(57) ABSTRACT

A method of training a deep learning model is provided, which relates to a field of artificial intelligence, in particular to a field of a natural language processing technology and a field of a machine translation technology. A specific implementation solution includes: processing sample source data and corresponding sample target data respectively by using the deep learning model, so as to obtain a first output value and a second output value; determining a regularization function value according to the first output value and the second output value; and adjusting a parameter of the depth learning model according to the regularization function value, so as to obtain a pre-trained depth learning model. A method of processing text data, an electronic device, and a storage medium are further provided.

18 Claims, 5 Drawing Sheets

210

| S211 | The sample source data and the sample target data are respectively input into the depth learning model to obtain a first reference output value and a second reference output value as the first output value |

| S212 | A word segmentation is performed on the sample source data and the sample target data respectively to obtain a plurality of source data segments and a plurality of target data segments |

| S213 | At least one of the plurality of source data segments and at least one of the plurality of target data segments are masked respectively to obtain masked source data and masked target data |

| S214 | The masked source data and the masked target data are respectively input into the depth learning model to obtain a first mask output value and a second mask output value as the second output value |

(56) References Cited

FOREIGN PATENT DOCUMENTS

| CN | 113469374 A | * 10/2021 | ........... G06F 18/214 |
|---|---|---|---|
| WO | 2017/079568 | 5/2017 | |

OTHER PUBLICATIONS

Second Chinese Office Action, issued in the corresponding Chinese application patent 202210189268.9, dated Jan. 28, 2023, 10 pages.

* cited by examiner

400

```
┌─────────────────────────────────────────────────┐
│ The sample source data is input into the pre-trained depth │─ S440
│ learning model to obtain a third reference output value    │
└─────────────────────────────────────────────────┘
                          │
                          ▼
┌─────────────────────────────────────────────────┐
│ The masked source data is input into the pre-trained depth │─ S450
│ learning model to obtain a third mask output value         │
└─────────────────────────────────────────────────┘
                          │
                          ▼
┌─────────────────────────────────────────────────┐
│ A parameter of the pre-trained depth learning model is adjusted │
│ according to the third reference output value and the third mask │─ S460
│ output value, so as to obtain a trained depth learning model    │
└─────────────────────────────────────────────────┘
```

FIG. 4

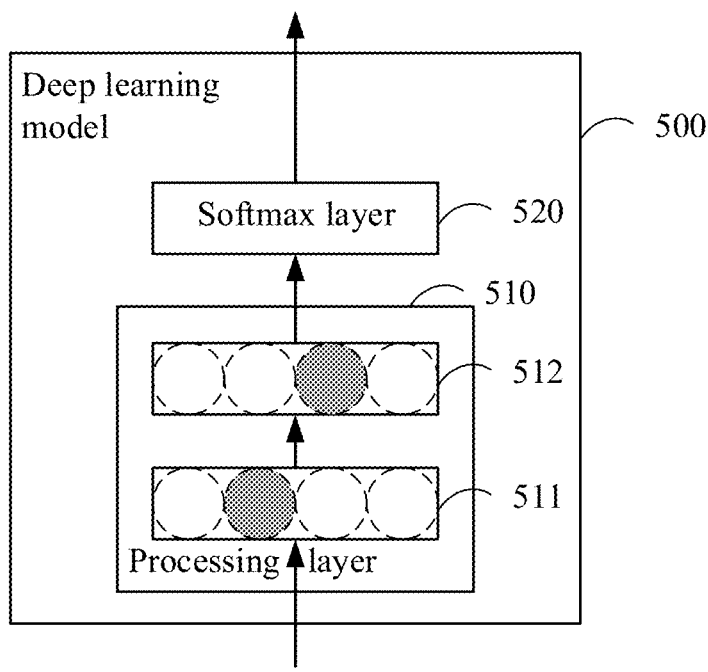

FIG. 5

600
Text data is input into a deep learning model to obtain a processing result — S610
FIG. 6
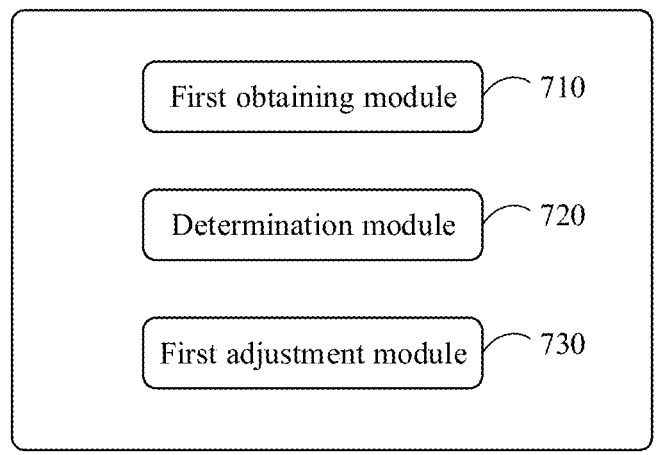
FIG. 7
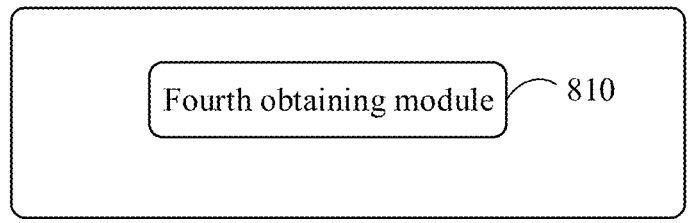
FIG. 8

METHOD OF TRAINING DEEP LEARNING MODEL AND METHOD OF PROCESSING TEXT DATA

CROSS-REFERENCE TO RELATED APPLICATION(S)

This application claims the benefit of Chinese Patent Application No. 202210189268.9 filed on Feb. 28, 2022, the whole disclosure of which is incorporated herein by reference.

TECHNICAL FIELD

The present disclosure relates to a field of an artificial intelligence technology, in particular to a field of a natural language processing technology and a field of a machine translation technology. More specifically, the present disclosure provides a method of training a deep learning model, a method of processing text data, an electronic device, and a storage medium.

BACKGROUND

Based on the natural language processing technology, a text in a natural language may be translated into a text in another natural language.

SUMMARY

The present disclosure provides a method of training a deep learning model, a method of processing text data, a device, and a storage medium.

According to an aspect, a method of training a deep learning model is provided, including: processing sample source data and corresponding sample target data respectively by using the deep learning model, so as to obtain a first output value and a second output value; determining a regularization function value according to the first output value and the second output value; and adjusting a parameter of the depth learning model according to the regularization function value, so as to obtain a pre-trained depth learning model.

In some embodiments, the sample source data includes text data of a first language, and the sample target data includes text data of a second language.

According to another aspect of the present disclosure, a method of processing text data is provided, including: inputting the text data into a deep learning model to obtain a processing result, wherein the deep learning model is trained using the method provided by the present disclosure.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method provided by the present disclosure.

According to another aspect of the present disclosure, a non-transitory computer-readable storage medium having computer instructions therein is provided, and the computer instructions are configured to cause a computer to implement the method provided by the present disclosure.

It should be understood that content described in this section is not intended to identify key or important feature in embodiments of the present disclosure, nor is it intended to limit the scope of the present disclosure. Other feature of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 4 shows a flowchart of a method of training a deep learning model according to embodiments of the present disclosure;

FIG. 5 shows a schematic diagram of a method of training a deep learning model according to embodiments of the present disclosure;

FIG. 6 shows a flowchart of a method of processing text data according to embodiments of the present disclosure;

FIG. 7 shows a block diagram of an apparatus of training a deep learning model according to embodiments of the present disclosure;

FIG. 8 shows a block diagram of an apparatus of processing a text according to embodiments of the present disclosure.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Based on a natural language processing technology, a deep learning model may be used for translation. A performance of a related deep learning model may be improved by increasing an amount of training data. However, a number of existing corpus training samples is limited, and it is difficult to further improve the performance of the deep learning model.

Figure 1:
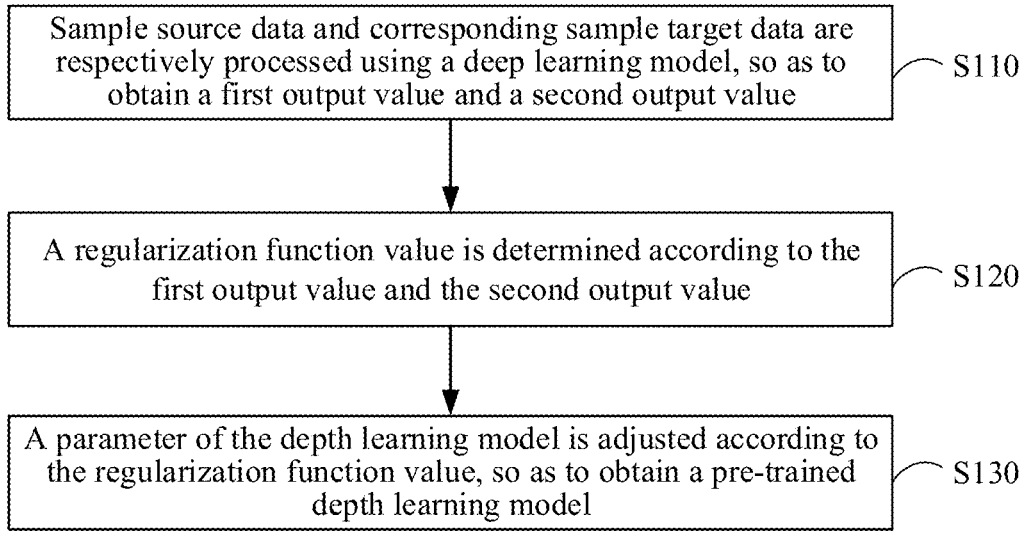
FIG. 1 shows a flowchart of a method of training a deep learning model according to embodiments of the present disclosure.

FIG. 1 shows a flowchart of a method of training a deep learning model according to embodiments of the present disclosure.

As shown in FIG. 1, a method 100 may include operation S110 to operation S130.

In operation S110, sample source data and corresponding sample target data are respectively processed using a deep learning model, so as to obtain a first output value and a second output value.

In embodiments of the present disclosure, the sample source data may include text data of a first language, and the sample target data may include text data of a second language.

For example, the text data of the first language may be a text in a natural language, and the text data of the second language may be a text in another natural language.

For example, the sample source data may be Chinese text data, and the sample target data may be English text data. In an example, sample source data x may be "今天天气很好", and sample target data y may be "The weather is good today".

For another example, the sample source data x may be input into the deep learning model to obtain a first reference output value $f(x, y; \theta)$. In addition, the sample target data y may be input into the deep learning model to obtain a second reference output value $f(y, x; \theta)$. The first reference output value $f(x, y; \theta)$ and the second reference output value $f(y, x; \theta)$ may be determined as the first output value. In an example, e may represent one or more parameters of the deep learning model.

In embodiments of the present disclosure, the sample source data may be processed to obtain processed sample source data, and the sample target data may be processed to obtain processed sample target data.

For example, processed sample source data x_proc may be input into the deep learning model to obtain a first processed output value $f(x\_proc, y\_proc; \theta)$, and processed sample target data y_proc may be input into the deep learning model to obtain a second processed output value $f(y\_proc, x\_proc; \theta)$.

The first processed output value $f(x\_proc, y\_proc; \theta)$ and the second processed output value $f(y\_proc, x\_proc; \theta)$ may be determined as the second output value.

In operation S120, a regularization function value is determined according to the first output value and the second output value.

For example, a difference between the first reference output value $f(x, y; \theta)$ and the first processed output value $f(x\_proc, y\_proc; \theta)$ may be determined, and a difference between the second reference output value $f(y, x; \theta)$ and the second processed output value $f(y\_proc, x\_proc; \theta)$ may be determined. The regularization function value may be determined according to these two differences. In an example, the regularization function value may be a consistency regularization function value.

In operation S130, a parameter of the depth learning model is adjusted according to the regularization function value, so as to obtain a pre-trained depth learning model.

For example, the parameter of the deep learning model may be adjusted so that the regularization function value meets a predetermined condition, so as to obtain the pre-trained deep learning model.

Through embodiments of the present disclosure, it is possible to further improve a performance of the deep learning model, especially a performance of a bidirectional-pretraining-based depth learning model.

In some embodiments, the above-mentioned predetermined condition may be that the regularization function value is less than a predetermined threshold value.

In some embodiments, various text data enhancement methods may be used to obtain the processed sample source data or the processed sample target data according to the sample source data or the sample target data.

In some embodiments, the sample source data may include text data of the first language, and the sample target data may include text data of the second language. For example, the text data of the first language may be Chinese text data, and the text data of the second language may be English text data. For another example, the text data of the first language may be English text data, and the text data of the second language may be Chinese text data.

Figure 2:
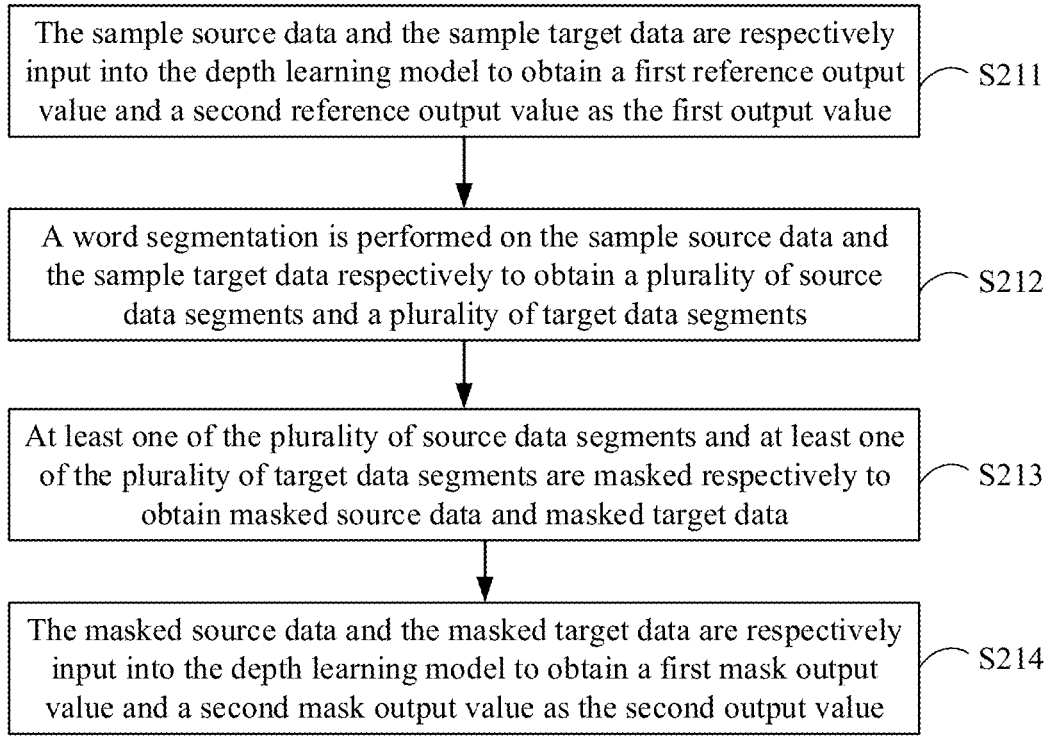
FIG. 2 shows a flowchart of a method of training a deep learning model according to embodiments of the present disclosure.

FIG. 2 shows a flowchart of a method of training a deep learning model according to embodiments of the present disclosure.

As shown in FIG. 2, a method 210 may be implemented to process sample source data and corresponding sample target data respectively by using a deep learning model, so as to obtain a first output value and a second output value. The detailed description will be given below in combination with operation S211 to operation S214.

In operation S211, the sample source data and the sample target data are respectively input into the depth learning model to obtain a first reference output value and a second reference output value as the first output value.

For example, as described above, the sample source data x may be input into the deep learning model to obtain the first reference output value $f(x, y; \theta)$. In addition, the sample target data y may be input into the deep learning model to obtain the second reference output value $f(y, x; \theta)$.

In operation S212, a word segmentation is performed on the sample source data and the sample target data respectively to obtain a plurality of source data segments and a plurality of target data segments.

For example, a word segmentation may be performed on the sample source data x "今天天气很好" to obtain a plurality of source data segments. In an example, one of the plurality of source data segments may be "天气".

For example, a word segmentation may be performed on the sample target data y "The weather is good today" to obtain a plurality of target data segments. In an example, one of the plurality of target data segments may be "today".

In operation S213, at least one of the plurality of source data segments and at least one of the plurality of target data segments are masked respectively to obtain masked source data and masked target data.

For example, the source data segment "天气" may be masked to obtain masked source data x_cut, and the target data segment "today" may be masked to obtain masked target data y_cut.

In operation S214, the masked source data and the masked target data are respectively input into the depth learning model to obtain a first mask output value and a second mask output value as the second output value.

For example, the masked source data x_cut may be input into the depth learning model to obtain a first mask output value $f(x\_cut, y\_cut; \theta)$, and the masked target data y_cut may be input into the depth learning model to obtain a second mask output value $f(y\_cut, x\_cut; \theta)$.

It should be noted that operation S211 may be performed firstly and then operation S212 to operation S214 are performed. However, embodiments of the present disclosure are not limited thereto, and these two groups of operations may also be performed in other orders. For example, operation S211 and operation S212 to operation S214 may be performed in parallel, or operation S212 to operation S214 may be performed firstly and then operation S211 is performed.

In some embodiments, the sample source data has a first label, and the sample target data has a second label.

For example, the sample source data x has a first label ÿ. For another example, the sample target data has a second label ẍ.

Figure 3:
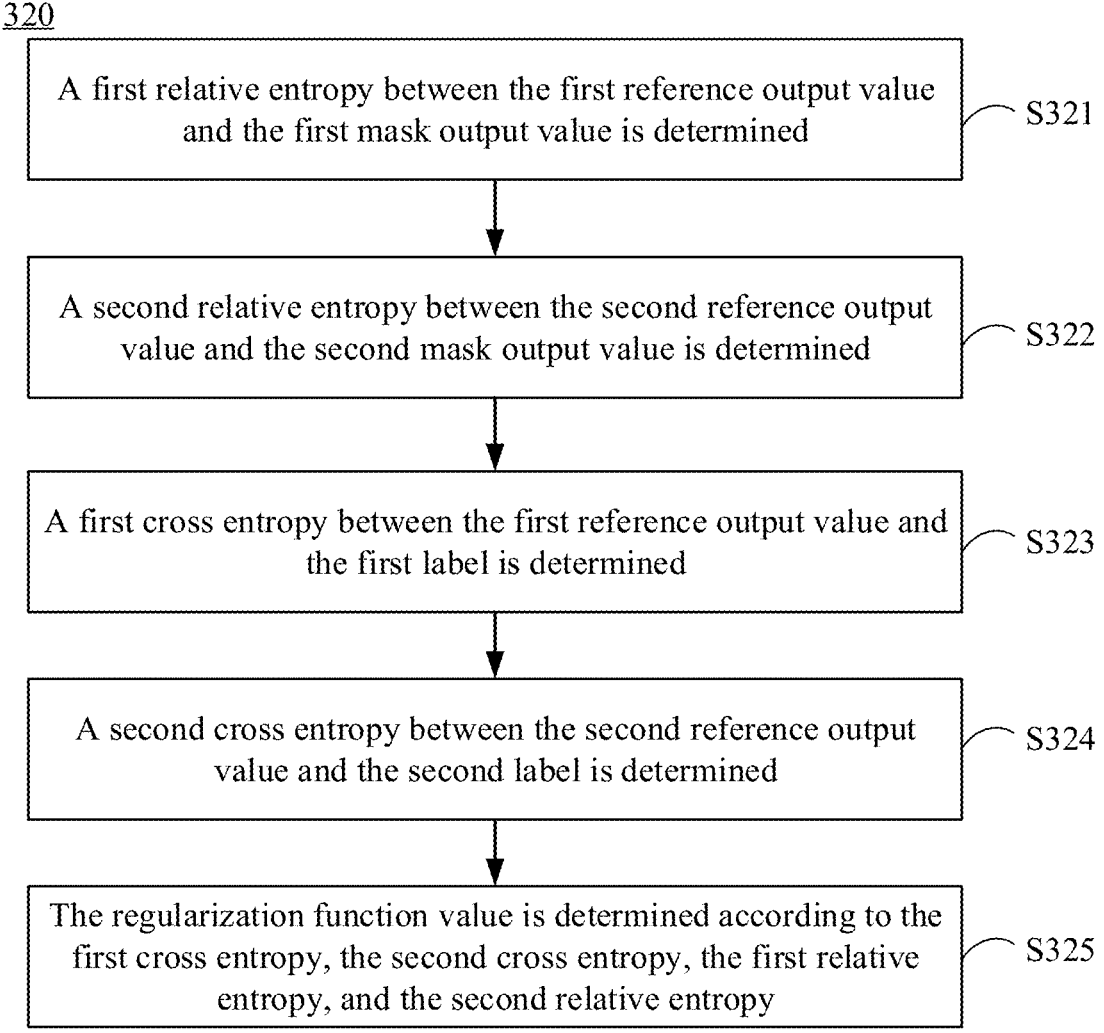
FIG. 3 shows a flowchart of a method of training a deep learning model according to embodiments of the present disclosure.

FIG. 3 shows a flowchart of a method of training a deep learning model according to other embodiments of the present disclosure.

As shown in FIG. 3, a method 320 may be implemented to determine a regularization function value based on the first output value and the second output value. The detailed description will be given below in combination with operation S321 to operation S325.

In operation S321, a first relative entropy between the first reference output value and the first mask output value is determined.

For example, a first relative entropy $KL(f(x, y; \theta) \| f(x\_cut, y\_cut; \theta))$ may be obtained according to the first reference output value $f(x, y; \theta)$ and the first mask output value $f(x\_cut, y\_cut; \theta)$.

In an example, KL(*) may be a Kullback-Leibler divergence function.

In operation S322, a second relative entropy between the second reference output value and the second mask output value is determined.

For example, a second relative entropy $KL(f(y, x; \theta) \| f(y\_cut, x\_cut; \theta))$ may be obtained according to the second reference output value $f(y, x; \theta)$ and the second mask output value $f(y\_cut, x\_cut; \theta)$.

In operation S323, a first cross entropy between the first reference output value and the first label is determined.

For example, a first cross entropy $l(f(x, y; \theta), ÿ)$ may be obtained according to the first reference output value $f(x, y; \theta)$ and the first label ÿ. l(*) is a cross entropy function.

In operation S324, a second cross entropy between the second reference output value and the second label is determined.

For example, a second cross entropy $l(f(y, x; \theta), ẍ)$ may be obtained according to the second reference output value $f(y, x; \theta)$ and the second label ẍ.

In operation S325, the regularization function value is determined according to the first cross entropy, the second cross entropy, the first relative entropy, and the second relative entropy.

For example, a regularization function value E may be determined by Equation (1).

$$E = {}_{(x,y)\in S}^{E}[l(f(x,y;\theta),ÿ) + l(f(y,x;\theta),ẍ) + \alpha KL(f(x,y;\theta) \| f(x\_cut,y\_cut;\theta)) + \alpha KL(f(y,x;\theta) \| f(y\_cut,x\_cut;\theta))] \quad (1)$$

For example, α is a hyperparameter, S is a sample dataset that the sample source data and the sample target data come from, and ${}_{(x,y)\in S}^{E}[*]$ is a regularization function. In an example, ${}_{(x,y)\in S}^{E}[*]$ may be used to calculate an expected value of the first cross entropy, the second cross entropy, the first relative entropy and the second relative entropy. The expected value may be determined as the regularization function value.

FIG. 4 shows a flowchart of a method of training a deep learning model according to other embodiments of the present disclosure.

As shown in FIG. 4, a method 400 may be performed after the operation S130 described above. The detailed description will be given below in combination with operation S440 to operation S460.

In operation S440, the sample source data is input into the pre-trained depth learning model to obtain a third reference output value.

For example, the sample source data x may be input into the pre-trained depth learning model to obtain a third reference value $f(x, y; \theta')$. $\theta'$ may represent one or more parameters of the pre-trained depth learning model.

In operation S450, the masked source data is input into the pre-trained depth learning model to obtain a third mask output value.

For example, the masked source data x_cut may be input into the pre-trained depth learning model to obtain a third mask output value $f(x_{cut}, y_{cut}; \theta')$.

In operation S460, a parameter of the pre-trained depth learning model is adjusted according to the third reference output value and the third mask output value, so as to obtain a trained depth learning model.

For example, a function value E may be determined by Equation (2).

$$E' = {}_{(x,y)\in S}^{E}[l(f(x,y;\theta'),ÿ) + \alpha KL(f(x,y;\theta') \| f(x\_cut,y\_cut;\theta'))] \quad (2)$$

Through embodiments of the present disclosure, a unidirectional fine-tuning may be performed on the pre-trained depth learning model to further improve the performance of the model.

FIG. 5 shows a schematic diagram of a method of training a deep learning model according to other embodiments of the present disclosure.

As shown in FIG. 5, a deep learning model 500 includes a processing layer 510 and a Softmax layer 520. The processing layer 510 may include a self-attention layer 511 and a feed-forward layer 512.

For example, the sample source data x " 今天天气很好 " and the sample target data y "The weather is good today" may be respectively input into the deep learning model 500 to output the first reference output value $f(x, y; \theta)$ and the second reference output value $f(y, x; \theta)$.

For another example, the masked source data x_cut and the masked target data y_cut may be respectively input into the deep learning model to output the first mask output value $f(x\_cut, y\_cut; \theta)$ and the second mask output value $f(y\_cut, x\_cut; \theta)$. In an example, the masked source data x_cut may be, for example, " 今天<MASK>很好 ", and the masked target data y_cut may be, for example, "The weather is good<MASK>".

In an example, the self-attention layer 511 and the feed-forward layer 512 may sequentially process the sample source data x and output an intermediate output value. The Softmax layer 520 may process the intermediate output value and output the first reference output value $f(x,y; \theta)$. Similarly, the deep learning model 500 may process the sample target data y, the masked source data x_cut, and the masked target data y_cut.

FIG. 6 shows a flowchart of a method of processing text data according to embodiments of the present disclosure.

As shown in FIG. 6, a method 600 may include operation S610.

In operation S610, text data is input into a deep learning model to obtain a processing result.

For example, the deep learning model is trained using the method provided by the present disclosure.

For example, Chinese text data may be input into the deep learning model, and the obtained processing result may be English text data. For another example, English text data may be input into the deep learning model, and the obtained processing result may be Chinese text data.

FIG. 7 shows a block diagram of an apparatus of training a deep learning model according to embodiments of the present disclosure.

As shown in FIG. 7, an apparatus 700 may include a first obtaining module 710, a determination module 720, and a first adjustment module 730.

The first obtaining module 710 may be used to process sample source data and corresponding sample target data respectively by using the deep learning model, so as to obtain a first output value and a second output value.

The determination module 720 may be used to determine a regularization function value according to the first output value and the second output value.

The first adjustment module 730 may be used to adjust a parameter of the depth learning model according to the regularization function value, so as to obtain a pre-trained depth learning model.

In some embodiments, the first obtaining module includes: a first obtaining sub-module used to input the sample source data and the sample target data respectively into the depth learning model, so as to obtain a first reference output value and a second reference output value as the first output value; a word segmentation sub-module used to perform a word segmentation on the sample source data and the sample target data respectively to obtain a plurality of source data segments and a plurality of target data segments; a masking module used to mask at least one of the plurality of source data segments and at least one of the plurality of target data segments respectively to obtain masked source data and masked target data; and a second obtaining sub-module used to input the masked source data and the masked target data respectively into the depth learning model, so as to obtain a first mask output value and a second mask output value as the second output value.

In some embodiments, the determination module includes: a first determination sub-module used to determine a first relative entropy between the first reference output value and the first mask output value; a second determination sub-module used to determine a second relative entropy between the second reference output value and the second mask output value; and a third determination sub-module used to determine the regularization function value according to the first relative entropy and the second relative entropy.

In some embodiments, the sample source data has a first label, and the sample target data has a second label; the determination module further includes: a fifth determination sub-module used to determine a first cross entropy between the first reference output value and the first label; a sixth determination sub-module used to determine a second cross entropy between the second reference output value and the second label; and a seventh determination sub-module used to determine the regularization function value according to the first cross entropy, the second cross entropy, the first relative entropy, and the second relative entropy.

In some embodiments, the apparatus 700 further includes: a second obtaining module used to input the sample source data into the pre-trained depth learning model to obtain a third reference output value; a third obtaining module used to input the masked source data into the pre-trained depth learning model to obtain a third mask output value; and a second adjustment module used to adjust a parameter of the pre-trained depth learning model according to the third reference output value and the third mask output value, so as to obtain a trained depth learning model.

In some embodiments, the second adjustment module includes: an eighth determination sub-module used to determine a third cross entropy between the third reference output value and a first label; a ninth determination sub-module used to determine a third relative entropy between the third reference output value and the third mask output value; and an adjustment sub-module used to adjust the parameter of the pre-trained depth learning model according to the third cross entropy and the third relative entropy.

FIG. 8 shows a block diagram of an apparatus of processing text data according to other embodiments of the present disclosure.

As shown in FIG. 8, an apparatus 800 may include a fourth obtaining module 810.

The fourth obtaining module 810 may be used to input the text data into a deep learning model to obtain a processing result.

The deep learning model is trained using the apparatus provided by the present disclosure.

In the technical solution of the present disclosure, an acquisition, a storage, a use, a processing, a transmission, a provision, a disclosure and an application of user personal information involved comply with the provisions of relevant laws and regulations, take essential confidentiality measures, and do not violate the public order and good customs. In the technical solution of the present disclosure, authorization or consent is obtained from the user before the user's personal information is obtained or collected.

According to embodiments of the present disclosure, the present disclosure further provides an electronic device, a readable storage medium, and a computer program product.

Figure 9:
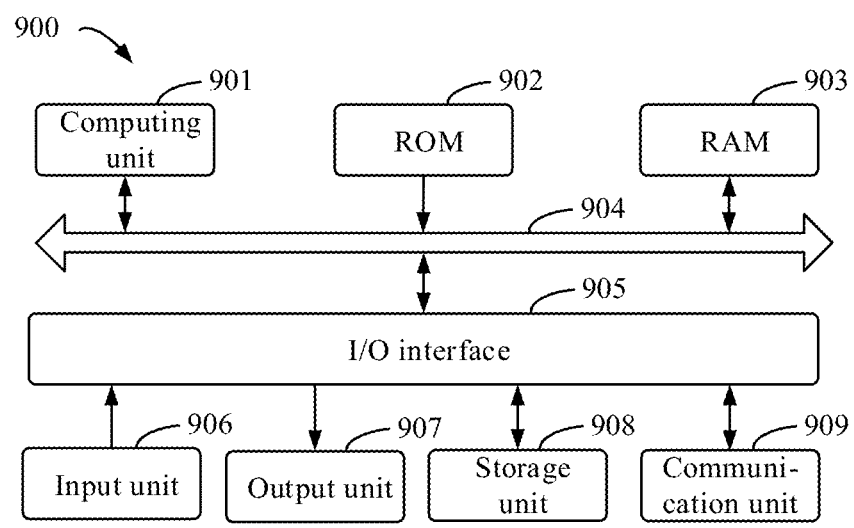
FIG. 9 shows a block diagram of an electronic device for implementing a method of training a deep learning model and/or a method of processing text data according to embodiments of the present disclosure.

FIG. 9 schematically shows a block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and steps described above, such as the method of training the deep learning model and/or the method of processing the text data. For example, in some embodiments, the method of training the deep learning model and/or the method of processing the text data may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of training the deep learning model and/or the method of processing the text data described above. Alternatively, in other embodiments, the computing unit 901 may be configured to perform the method of training the deep learning model and/or the method of processing the text data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server for distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a deep learning model, comprising:
   processing sample source data and corresponding sample target data respectively by using the deep learning model, so as to obtain a first output value and a second output value;
   determining a regularization function value according to the first output value and the second output value; and adjusting a parameter of the depth learning model according to the regularization function value, so as to obtain a pre-trained depth learning model,
wherein the processing sample source data and corresponding sample target data respectively by using the deep learning model, so as to obtain a first output value and a second output value comprises:
inputting the sample source data and the sample target data respectively into the depth learning model, so as to obtain a first reference output value and a second reference output value as the first output value;
performing a word segmentation on the sample source data and the sample target data respectively to obtain a plurality of source data segments and a plurality of target data segments;
masking at least one of the plurality of source data segments and at least one of the plurality of target data segments respectively to obtain masked source data and masked target data; and
inputting the masked source data and the masked target data respectively into the depth learning model, so as to obtain a first mask output value and a second mask output value as the second output value.

2. The method according to claim 1, wherein the determining a regularization function value according to the first output value and the second output value comprises:
determining a first relative entropy between the first reference output value and the first mask output value;
determining a second relative entropy between the second reference output value and the second mask output value; and
determining the regularization function value according to the first relative entropy and the second relative entropy.

3. The method according to claim 2, wherein the sample source data has a first label, and the sample target data has a second label; the determining a regularization function value according to the first output value and the second output value further comprises:
determining a first cross entropy between the first reference output value and the first label;
determining a second cross entropy between the second reference output value and the second label; and
determining the regularization function value according to the first cross entropy, the second cross entropy, the first relative entropy, and the second relative entropy.

4. The method according to claim 1, further comprising:
inputting the sample source data into the pre-trained depth learning model to obtain a third reference output value;
inputting the masked source data into the pre-trained depth learning model to obtain a third mask output value; and
adjusting a parameter of the pre-trained depth learning model according to the third reference output value and the third mask output value, so as to obtain a trained depth learning model.

5. The method according to claim 4, wherein the adjusting a parameter of the pre-trained depth learning model according to the third reference output value and the third mask output value, so as to obtain a trained depth learning model comprises:
determining a third cross entropy between the third reference output value and a first label;
determining a third relative entropy between the third reference output value and the third mask output value; and
adjusting the parameter of the pre-trained depth learning model according to the third cross entropy and the third relative entropy.

6. The method according to claim 2, further comprising:
inputting the sample source data into the pre-trained depth learning model to obtain a third reference output value;
inputting the masked source data into the pre-trained depth learning model to obtain a third mask output value; and
adjusting a parameter of the pre-trained depth learning model according to the third reference output value and the third mask output value, so as to obtain a trained depth learning model.

7. The method according to claim 6, wherein the adjusting a parameter of the pre-trained depth learning model according to the third reference output value and the third mask output value, so as to obtain a trained depth learning model comprises:
determining a third cross entropy between the third reference output value and a first label;
determining a third relative entropy between the third reference output value and the third mask output value; and
adjusting the parameter of the pre-trained depth learning model according to the third cross entropy and the third relative entropy.

8. The method according to claim 3, further comprising:
inputting the sample source data into the pre-trained depth learning model to obtain a third reference output value;
inputting the masked source data into the pre-trained depth learning model to obtain a third mask output value; and
adjusting a parameter of the pre-trained depth learning model according to the third reference output value and the third mask output value, so as to obtain a trained depth learning model.

9. The method according to claim 8, wherein the adjusting a parameter of the pre-trained depth learning model according to the third reference output value and the third mask output value, so as to obtain a trained depth learning model comprises:
determining a third cross entropy between the third reference output value and a first label;
determining a third relative entropy between the third reference output value and the third mask output value; and
adjusting the parameter of the pre-trained depth learning model according to the third cross entropy and the third relative entropy.

10. A method of processing text data, comprising:
inputting the text data into a deep learning model to obtain a processing result, wherein the deep learning model is trained using the method according to claim 1.

11. A method of processing text data, comprising:
inputting the text data into a deep learning model to obtain a processing result, wherein the deep learning model is trained using the method according to claim 3.

12. A method of processing text data, comprising:
inputting the text data into a deep learning model to obtain a processing result, wherein the deep learning model is trained using the method according to claim 3.

13. A method of processing text data, comprising:
inputting the text data into a deep learning model to obtain a processing result, wherein the deep learning model is trained using the method according to claim 4.

14. A method of processing text data, comprising:
inputting the text data into a deep learning model to obtain a processing result, wherein the deep learning model is trained using the method according to claim 5.

15. An electronic device, comprising:
at least one processor; and
a memory communicatively connected to the at least one processor, wherein the memory stores instructions executable by the at least one processor, and the instructions, when executed by the at least one processor, cause the at least one processor to:
process sample source data and corresponding sample target data respectively by using the deep learning model, so as to obtain a first output value and a second output value;
determine a regularization function value according to the first output value and the second output value; and
adjust a parameter of the depth learning model according to the regularization function value, so as to obtain a pre-trained depth learning model,
wherein the instructions, when executed by the at least one processor, further cause the at least one processor to:
input the sample source data and the sample target data respectively into the depth learning model, so as to obtain a first reference output value and a second reference output value as the first output value;
perform a word segmentation on the sample source data and the sample target data respectively to obtain a plurality of source data segments and a plurality of target data segments;
mask at least one of the plurality of source data segments and at least one of the plurality of target data segments respectively to obtain masked source data and masked target data; and
input the masked source data and the masked target data respectively into the depth learning model, so as to obtain a first mask output value and a second mask output value as the second output value.

16. An electronic device, comprising:
at least one processor; and
a memory communicatively connected to the at least one processor, wherein the memory stores instructions executable by the at least one processor, and the instructions, when executed by the at least one processor, cause the at least one processor to:
input the text data into a deep learning model to obtain a processing result, wherein the deep learning model is trained using the electronic device according to claim 15.

17. A non-transitory computer-readable storage medium having computer instructions therein, wherein the computer instructions are configured to cause a computer to:
process sample source data and corresponding sample target data respectively by using the deep learning model, so as to obtain a first output value and a second output value;
determine a regularization function value according to the first output value and the second output value; and
adjust a parameter of the depth learning model according to the regularization function value, so as to obtain a pre-trained depth learning model,
wherein the computer instructions are further configured to cause the computer to:
input the sample source data and the sample target data respectively into the depth learning model, so as to obtain a first reference output value and a second reference output value as the first output value;
perform a word segmentation on the sample source data and the sample target data respectively to obtain a plurality of source data segments and a plurality of target data segments;
mask at least one of the plurality of source data segments and at least one of the plurality of target data segments respectively to obtain masked source data and masked target data; and
input the masked source data and the masked target data respectively into the depth learning model, so as to obtain a first mask output value and a second mask output value as the second output value.

18. A non-transitory computer-readable storage medium having computer instructions therein, wherein the computer instructions are configured to cause a computer to:
input the text data into a deep learning model to obtain a processing result, wherein the deep learning model is trained using the non-transitory computer-readable storage medium according to claim 17.

* * * * *